United States Patent Office 3,281,888
Patented Nov. 1, 1966

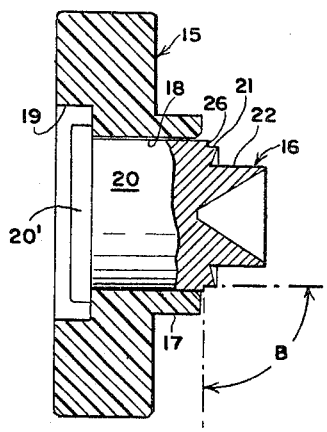
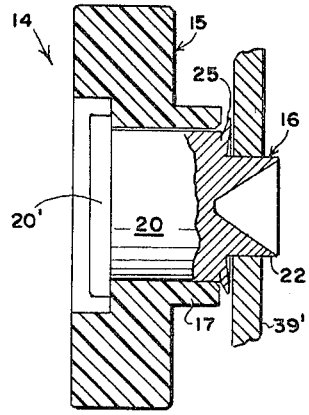
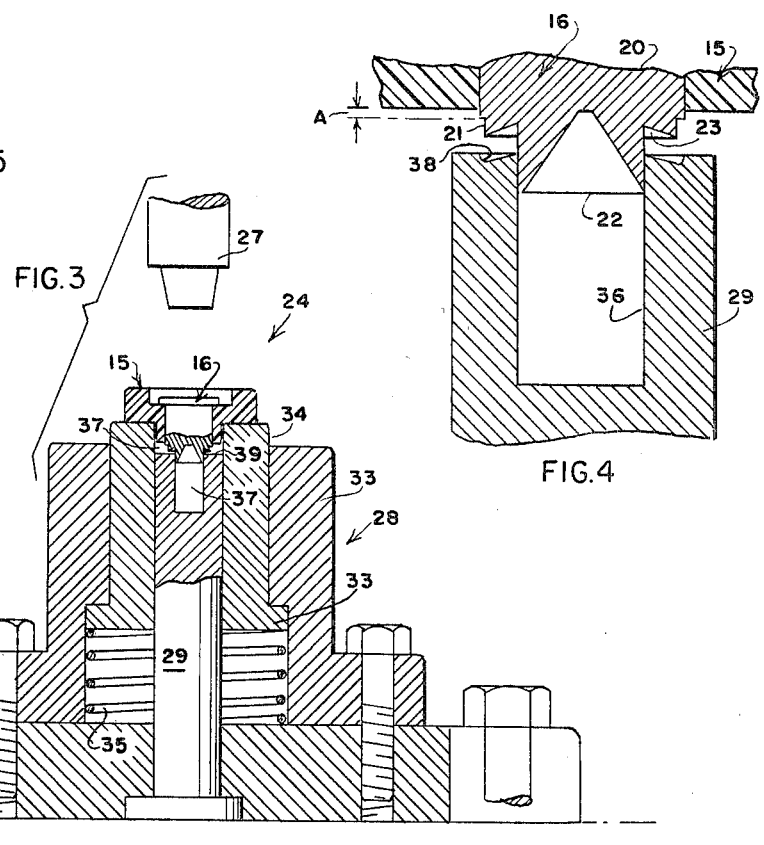

3,281,888
STUD SHAFT ROLLERS
Edward M. Stankewich, 49 Maxwell Road,
Garden City, N.Y.
Filed Jan. 13, 1965, Ser. No. 425,294
2 Claims. (Cl. 16—97)

The present invention relates to a stud shaft carrying a roller wheel and more particularly to the types which for example are used in connection with sliding doors and drawers. In marketed items of this class, the wheels are molded of plastic and the studs on which they are rotatably mounted, are machine screw products.

It is common to have the wheel with a rearward hub and a front counterbore of its shaft hole. One end of the shaft is provided with a head lying within the confines of said counterbore and there is a reduced extension at the other shaft end for attachment to a drawer wall or other suitable place as the installation may require or provide. Such extension is outside the hub and the rear end of the shaft portion of the stud is also beyond the hub, where such end is enlarged to maintain the assembly of said wheel and stud.

This invention is primarily concerned with the manner in which the wheel and its stud are held together to form a unitary structure. It has been suggested that the wheel retaining means shall be a slight ridge at the rear end of the shaft, small enough to permit the stud to be entered into the wheel by relying upon the resilient quality of the wheel body, and yet large enough to maintain the parts assembled in normal use. This has proven unsatisfactory because the wheel and the stud must be held in true coaxial relation to be assembled and though the ridge is low, wheels have cracked or have become distorted in making the assembly.

Another method heretofore used was to swage the shaft end after the wheel is mounted, to form a retaining flange. This has also proven unsatisfactory because the flange often engaged the wheel and made it tight on the shaft, because the distance between the flange and wheel could not be controlled, unless removable spacers were used.

It is therefore the principal object of this invention to provide a novel and improved stud shaft construction where the swaging method is used to form a flange, but a prescribed distance is maintained between the flange formed and the wheel; such distance being determined by a feature of shaft structure.

Another object is to provide a novel and improved wheel and stud shaft assembly of the character described, which is simple in construction, reasonable in cost to manufacture, easy to effect and efficient in carrying out the purposes for which it is designed.

Other objects and advantages will become apparent as this disclosure proceeds.

For one practice of this invention, the stud is headed at one end and is of a length so it projects a prescribed relatively short distance beyond the wheel at its other end. Here, the shaft continues, but is of a first reduced section, and finally as a further second reduced section. The length of said first reduced section is greater than the difference in the radii of the shaft and said first reduced section, plus the difference in radii of said shaft and the shaft hole in the wheel. Also said first reduced section is a ring form so there is an annular space between said first and second reduced sections. It is preferred that the shape of said space be that of a frustoconical annulus.

After the wheel is mounted on the shaft, meaning it is merely set thereon, a tool means is applied to swage said ring to spread outwardly and around towards the wheel, thus forming a retaining flange which will be no nearer to the wheel than the step between the shaft and said first section, was originally.

In the accompanying drawing forming part of this specification, similar characters of reference indicate corresponding parts in all the views.

FIG. 1 is a side elevational view showing a roller set on a shaft stud, ready to be assembled. The construction is in accordance with the teachings of this invention and is shown partly in section.

FIG. 2 is a similar view showing the wheel and stud associated in permanent assembly, ready to be mounted for use.

FIG. 3 is a sectional view of punch press die means which may be used for the swaging operation to form the required retaining flange on the shaft. This view also shows a wheel and its stud positioned ready to have said flange made. This view is drawn to a reduced scale.

FIG. 4 is an enlarged fragment of FIG. 3.

FIG. 5 is a view like FIG. 1, showing a slightly modified construction.

FIG. 6 is a view like FIG. 5, showing the wheel and stud associated in permanent assembly, ready to be mounted for use.

In the drawing, the numeral 15 generally designates a plastic wheel, as of nylon, rotatably mounted on a one-piece stud of cold rolled steel, indicated generally by the numeral 16. Said wheel has a rearward hub 17, and a forward counterbore 19 for the central shaft hole 18. Said stud comprises a shaft section 20 having a head 20' at its forward end, and rearwardly there is a first reduced section 21 which is a ring and a second reduced section 22 which extends rearwardly out of said ring; said ring surrounding and being in spaced relation with said second reduced section. The annular space 23 between said ring and second extension is preferably frustoconical in shape, hence the inner surface of said ring 21 flares rearwardly outwardly.

The length of said first reduced section 21 along the outside of said stud 16, is greater than the difference of the radii of the shaft section 20 and said first reduced section 21, plus the difference in radii of said shaft section 20 and the hole 18 in said hubbed wheel. The shaft section 20 protrudes slightly a prescribed distance "A" rearwardly from the hub 17, to determine the play of the wheel along the shaft section when the ring constituting the section 21 is swaged by for instance a tool means indicated generally by the numeral 24, to form the wheel-retaining flange 25, which abuts the shoulder 26 as shown in FIG. 2, which is the finished product indicated generally by the numeral 14.

The tool means 24 for use in a punch press, not shown, employs the ram 27 to cooperate with the die denoted generally by the numeral 28, which comprises an upright post 29, concentrically spaced within the tubular member 30, both of which are fixed on a base 31, secured on the bed 32 of the press. The lower portion of said tubular member 30 is counterbored to provide a shoulder stop for the flange 33 on the bottom of an upright tubular stripper 34. This stripper is slidably fitted on the upper end of said post and normally reaches above said post, as biased by the compression coil spring 35. The upper end of said post has a socket 36 to receive the second reduced section 22 of the stud 16. Said stud is set upright, head upwards and carries the wheel 15, so said wheel rests on the upper end of the stripper member 34, while the hub 22 sets within the stripper's hole 37, and the head 20' of said stud sets in and is within the confines of said counterbore 19 in the wheel. The second reduced section 22 fits slidably into the socket 36 of the swageing post 29. The upper end of said post has a circular groove 38, into which the ring 21 moves when the ram 27 is brought forcibly onto the stud's head 20', upon operation of the press. This causes the ring 21 to be spread outwardly to form the flange 25, so the parts 15 and 16 are assembled. The design of the groove 38 is designed to accomplish this work, as is well known in the art. The stroke of the ram is adjusted to just close the angle B, and even if ram movement is a little beyond, the triangular cross section of the flange, will keep the flange spaced from the hub 22. It is to be noted that the shoulder 21 formed at the junction of the shaft and ring, is a prime factor determining flange position. Upon the upward stroke of the ram 27, the stripper will rise due to action of the spring 29 and the finished article 14 will be ejected or presented for easy removal, ready to be mounted for use on for instance, the wall 39' of a drawer.

The post 29 of the tool 24, may have the groove 38, or may be flat as shown at 39.

The annular channel on the stud shaft 29, made by the wall surfaces 26 and 21, has wall 21 cylindrical. In the embodiment shown in FIGS. 5 and 6, there is the channel 40, but the surface 21' is conical, and when the ring 41 is flattened down to the condition 41' by the tool 24, it is clear of the hub of the wheel 15', which is countersunk as shown at 42.

This invention is capable of various forms and applications without departing from the essential features herein disclosed. It is therefore intended and desired that the embodiments shown herein shall be deemed illustrative and not restrictive and that the patent shall cover all patentable novelty set forth herein, reference being had to the following claims rather than to the specific description and showings herein, to indicate the scope of this invention.

I claim:
1. In combination, a stud shaft having a head at one end and a wheel structure having a central hole therethrough; said shaft being easily insertable into and positioned through said hole and said wheel structure being adjacent said head, the improvement being in that said stud shaft is one piece and comprises a shaft section having a head at one end thereof, and at its other end a reduced first section which is a ring, whereby an annular channel is formed at the junction of said sections; the largest diameter of said sections being smaller than the diameter of the hole in the wheel and a second reduced section extending through said ring and outwardly therefrom in the direction away from said head; whereby on deforming said ring outwardly and towards said head to close said annular channel, a flange is formed of said ring for maintaining the assembly of said wheel structure and said stud shaft.

2. An article as defined in claim 1, wherein said annular channel's wall which is farthest from said head, is the outer wall of said ring and frusto-conical in shape.

References Cited by the Examiner
FOREIGN PATENTS

P 9,813    6/1956    Germany.
189,369    2/1937    Switzerland.

EDWARD C. ALLEN, *Primary Examiner.*

BOBBY R. GAY, *Examiner.*

J. H. McGLYNN, *Assistant Examiner.*